(12) United States Patent
Bakshan et al.

(10) Patent No.: US 10,419,426 B2
(45) Date of Patent: *Sep. 17, 2019

(54) CACHED CREDENTIALS FOR OFFLINE DOMAIN JOIN AND LOGIN WITHOUT LOCAL ACCESS TO THE DOMAIN CONTROLLER

(71) Applicant: VMware, Inc., Palo Alto, CA (US)

(72) Inventors: Igal Bakshan, Herzliya (IL); Yair Yogev, Herzliya (IL); Nohar Halperin, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,318

(22) Filed: Jul. 6, 2018

(65) Prior Publication Data

US 2018/0332025 A1   Nov. 15, 2018

Related U.S. Application Data

(63) Continuation of application No. 15/359,524, filed on Nov. 22, 2016, now Pat. No. 10,033,730.

(51) Int. Cl.
| | |
|---|---|
| *H04L 29/06* | (2006.01) |
| *H04L 29/08* | (2006.01) |
| *G06F 9/4401* | (2018.01) |
| *G06F 16/11* | (2019.01) |
| *G06F 9/455* | (2018.01) |
| *G06F 9/451* | (2018.01) |
| *H04L 29/12* | (2006.01) |

(52) U.S. Cl.
CPC ............ *H04L 63/083* (2013.01); *G06F 9/442* (2013.01); *G06F 9/4405* (2013.01); *G06F 9/452* (2018.02); *G06F 9/45558* (2013.01); *G06F 16/128* (2019.01); *H04L 61/1582* (2013.01); *H04L 61/3015* (2013.01); *H04L 63/0272* (2013.01); *H04L 63/20* (2013.01); *H04L 67/1097* (2013.01); *H04L 67/38* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 8,904,081 | B1 | 12/2014 | Kulkarni | |
| 9,213,513 | B2 | 12/2015 | Hartz | |
| 9,626,215 | B2 * | 4/2017 | Yang | ........................ G06F 8/61 |
| 10,033,730 | B2 * | 7/2018 | Bakshan | .............. H04L 61/1582 |
| 2007/0300220 | A1 | 12/2007 | Seliger | |

(Continued)

*Primary Examiner* — Kaveh Abrishamkar (57) ABSTRACT

Techniques are described for performing an offline domain join and login on behalf of a computing device in order to enable the device to access corporate resources without local access to the domain controller. A slave service is described that can start a virtual machine on a local network of the enterprise, perform an offline domain join of the virtual machine, perform a first login to the virtual machine using credentials of a remote user and then capture the changes made on the virtual machine and deliver those changes to the remote user's device. These changes can then be applied on the user's device to add the credentials and configuration changes necessary for the user to access the private enterprise resources remotely.

20 Claims, 5 Drawing Sheets

(56) References Cited

U.S. PATENT DOCUMENTS

| | | |
|---|---|---|
| 2007/0300221 A1* | 12/2007 | Hartz .................... G06F 3/1222 718/1 |
| 2012/0158920 A1 | 6/2012 | Yang |
| 2014/0201735 A1 | 7/2014 | Kannan |
| 2016/0378528 A1 | 12/2016 | Zamir |
| 2017/0052717 A1 | 2/2017 | Rawat |
| 2017/0235950 A1 | 8/2017 | Gopalapura Venkatesh |

* cited by examiner

CACHED CREDENTIALS FOR OFFLINE DOMAIN JOIN AND LOGIN WITHOUT LOCAL ACCESS TO THE DOMAIN CONTROLLER

CLAIM OF PRIORITY

This application claims priority to and is a continuation of U.S. patent application Ser. No. 15/359,524, filed on Nov. 22, 2016, by Igal Bakshan, et al., entitled "Cached Credentials For Offline Domain Join and Login Without/Local Access To The Domain Controller", which is incorporated herein by reference in its entirety.

TECHNICAL FIELD

The present disclosure generally relates to computing device management in enterprise environments and more particularly relates to techniques for joining a computing device to a domain over a remote network connection.

BACKGROUND

A typical IT department of a large enterprise needs to enable users to easily connect to the various enterprise resources while ensuring that security is maintained across the entire ecosystem. In many cases, enterprises provide specifically preconfigured computing devices, such as laptops, to their employees which the employees use to access the applications and other corporate resources used for work. This typically means that the organization not only needs to purchase all of these numerous devices but must also expend substantial resources to manage them, repair them and the like. One alternative that has been proposed is sometimes referred to as "Bring Your Own Device" (BYOD), where employees are allowed to bring their own devices and are asked to merely add the software specified by the enterprise to those devices. After installing the necessary software, the employee is permitted to bring their own individually owned device to work and utilize it as a work device to access privileged company information and applications (many of which are located on the corporate network). In one possible implementation of BYOD, individual users install a hypervisor on their computing device which is used to execute virtual machines and one or more of those virtual machines is provided by the organization to be used for accessing enterprise resources. Hypervisors enable the creation and execution of virtual machines (VMs), which are software emulations of real physical computers. Each VM may include its own guest operating system, applications and configuration, similar to a physical computer. In a BYOD implementation mentioned above, a single user's computer may be running separate VMs to represent their "personal computer" and their "work computer" which might contain sensitive data of the organization and so on. In some cases, the user can simply download the VM configured as their "work computer" over a remote network connection (e.g. Internet), which can be useful in situations where the user is working remotely.

In both the BYOD scenario and in more conventional situations where the enterprise provides actual physical devices to its users, each device typically needs to be first configured to join the domain of the enterprise. This is done mostly for security reasons to ensure that persons outside of the organization cannot access internal private enterprise resources. Conventionally, to complete the domain join and other security configuration of the device, the device typically needs to be connected to the local network of the enterprise at least once. After all of the configurations are complete and the device is trusted, the user may login remotely during future logins (e.g. via a VPN connection or the like). In some cases, this requirement of local connectivity may turn out to be fairly inconvenient, especially in situations where the user may be geographically located far away from the physical premises of the organization. Some solutions have been attempted to enable a full domain join and security configuration over remote connections, however such solutions have either been incomplete, required technologies such as Virtual Private Network (VPN) access, DirectAccess (Unified Remote Access), Read Only Domain Controller (RODC), which are not always readily available, or have simply been inconvenient for other reasons.

DETAILED DESCRIPTION

Systems and methods are described for performing an offline domain join and login on behalf of a computing device in order to enable the device to access corporate resources without local access to the domain controller. In particular, embodiments described herein utilize a service that can start a virtual machine on a local network of the enterprise, perform an offline domain join of the virtual machine, login to the virtual machine using credentials of a remote user and then capture the changes made on the virtual machine and deliver those changes to the remote user's device. These changes can then be applied on the user's device to add the credentials and configuration changes necessary for the user to access the private enterprise resources remotely.

In various embodiments, the process may begin when the individual user (e.g. employee) requests a virtual machine that will be used as a "work computer" from the IT department of the organization. Typically, the request is received from the user's computing device (e.g. laptop) over a remote network connection, such as a Wide Area Network (WAN) connection (e.g. Internet connection). The user's device may begin the process of downloading the virtual disk (e.g. VMDK or VHD) that will represent the virtual machine over the remote network connection. In one embodiment, the user's computing device will have a hypervisor installed thereon, which will be used to execute the downloaded VM as the user's work computer. Since the size of the virtual disk is frequently large because it contains various applications and data, it may take a substantial amount of time for the user to complete downloading the VM to their device. During this time period, a slave service can be started to perform a full domain join and capture the cached credentials, as described below, which could later be used by the VM to remotely access enterprise resources without ever having been locally connected to the local network of the enterprise.

In response to the request for a VM from the user, the process to perform an offline domain join and security configuration of the virtual machine may be triggered. A server residing on the corporate Local Area Network (LAN) of the enterprise having local access to an Active Directory (AD) server and other private enterprise resources may receive the username and password from the user requesting the virtual machine. The username and password would typically be established for the user by the IT department and serve to uniquely identify the individual user requesting the VM. In one embodiment, during the process of downloading the VM, a slave service is started. The slave service first captures a snapshot of the VM (e.g. VMDK) that is being downloaded by the user's device. This snapshot represents the state of the VM before it has been joined to the domain, i.e. it is a pre-domain-join snapshot. Once the snapshot has been captured, the service powers on the VM represented by the snapshot, performs an offline domain join of the VM with the Active Directory server on the corporate network and performs a first login to the VM automatically. The first login is performed using the received username and password of the user—that is, the service logs into the VM as the remote user that requested the VM. The process of performing the offline domain join with the Active Directory server produces a binary blob and logging into the VM for the first time produces an encrypted cached credential on the VM. Subsequent to this process, the VM is trusted and could be used to access private enterprise resources even remotely. Once the domain join and first login have been completed, the service powers off the VM, captures a post-domain-join snapshot of the VM and produces a delta based on the differences between the pre-domain-join snapshot and the post-domain-join snapshot. This delta contains all of the credentials and configuration that have been changed on the VM during the process of performing the offline domain join and the first login. The delta can be transmitted to the user's computing device, where the delta can be merged with the downloaded virtual disk in order to add the cached credentials and other necessary configuration changes to the user's computing device and to enable the downloaded VM to access the enterprise resources remotely.

The process of performing the offline domain join and first login in the manner described herein enables the remote user to download and begin using the VM to access private enterprise resources without ever having to locally connect their device to the corporate network of the enterprise. This can be advantageous where the user is located a large geographic distance away from the corporate premises and is generally more convenient for employees accessing corporate resources.

With regard to the terminology used throughout this disclosure, the term "hypervisor", also sometimes referred to as a virtual machine monitor or a virtual machine manager (VMM), refers to the software that runs virtual machines on a physical computer. The physical computer on which the hypervisor is running is usually referred to as the "host" computer, while the individual virtual machines are referred to as "guests". Each virtual machine (VM) can be a full virtual representation of a real physical computer, including a virtual representation of the hard drive (referred to herein as a virtual disk or a virtual machine disk (VMDK)), and the VM can run a full instance of a complete operating system (referred to as a "guest" operating system).

In general, hypervisors are often classified into two categories—the type 1 "native" hypervisors (also sometimes referred to as "bare metal" hypervisors) and the type 2 "hosted" hypervisors. Native hypervisors run directly on the host computer's hardware and native hypervisors can themselves host multiple virtual machines that have individual guest operating systems. In contrast, hosted hypervisors run within a conventional host operating system (e.g, Windows, Linux, macOS, etc.) and thus hosted hypervisors represent a second layer of software above the hardware. Traditionally, virtualized BYOD implementations have utilized primarily hosted hypervisor environments, however many techniques described in this disclosure can be applied to native hypervisors as well.

Figure 1:
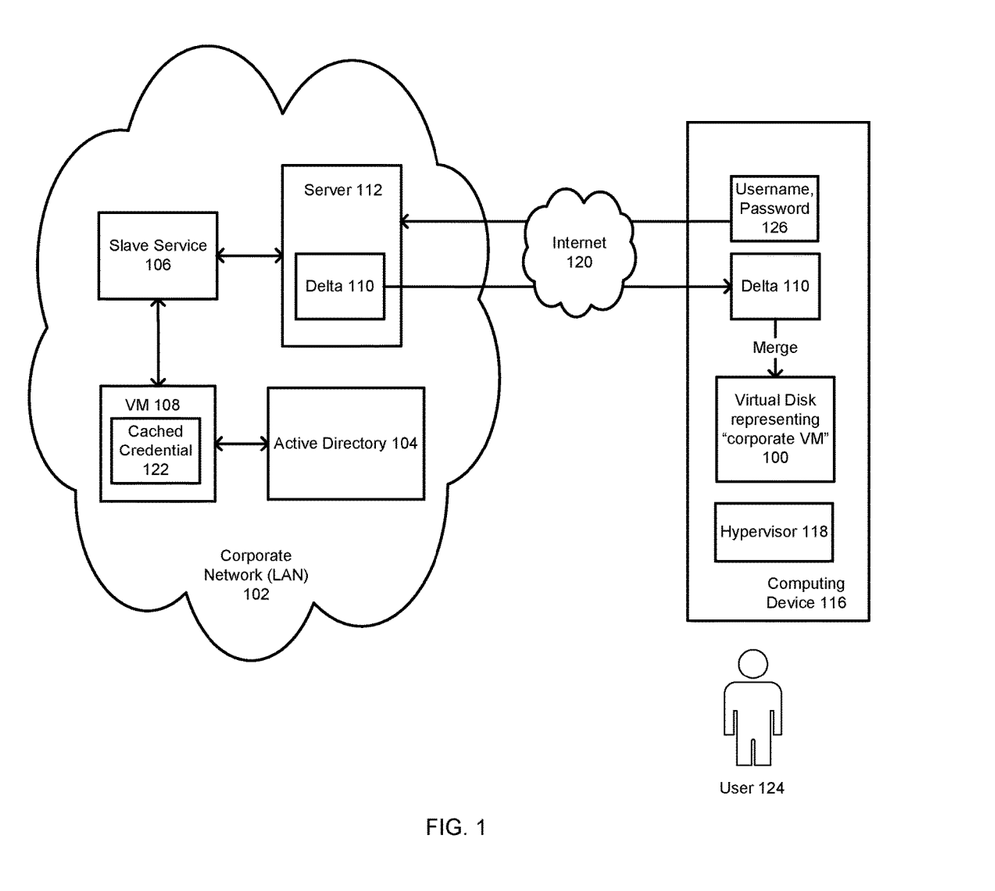
FIG. 1 illustrates an example a system level diagram where offline domain join can be performed, in accordance with various embodiments.

FIG. 1 illustrates an example a system level diagram where offline domain join and security configuration can be performed, in accordance with various embodiments. As previously described, a remote user's computing device 116 (e.g., a laptop) can include a host operating system 128, such as Microsoft Windows, Linux, macOS or the like. The host operating system 128 may be running a hosted hypervisor 118 which can be used to execute a plurality of virtual machines. Some examples of a hosted hypervisor are VMware Fusion and VMware Workstation, available from VMware, Inc. Each virtual machine can include its own individual guest operating system (OS) and its own individual virtual disk, such as virtual disk 100. In various embodiments, the virtual disk 100 represents a real physical hard disk, including its structure and organization, and is typically interpreted by the hypervisor 118 as a system hard disk drive. Virtual disks conventionally have a particular file type extension, such as .VMDK or .VHD.

A remote user's computing device, such as device 116, can be utilized in a Bring Your Own Device (BYOD) scenario, where the user 124 can use the computing device 116 to access privileged corporate information, applications and other resources. In one particular embodiment, the user can download a virtual disk 100 representing a "corporate" virtual machine (VM) that has been provisioned the IT department of the enterprise over a remote network connection, such as the Internet 120 connection. This corporate VM can then be executed using the hosted hypervisor 118 operating on device 116 and because the corporate VM has been created and configured by the enterprise, the VM can be used by user 124 to access private corporate resources of the enterprise, including resources that are located on the corporate LAN 102 behind a secure firewall.

Providing security in such a BYOD environment can be a challenging task. The device that is used for running corporate VM (e.g. device 116 running the hypervisor 118) is not trusted, yet IT administrators typically want to use these devices in order to run a VM that is based on a certain corporate template, sometimes referred to as the "vanilla" or "master" image. Such a master template might be generated once or there may be several different templates for different organizational roles of employees, however templates are usually not customized for each individual employee. The computer domain subscription (domain join) is therefore critical in active directory management. This is because after a computer joins the domain, the IT administrator can apply security policies based on the user, the user's organization unit, domain, and the like.

When provisioning the VM from the template, the server 112 would join the operating system (e.g. Windows) to the domain using offline domain join, meaning the machine record would be created in the Active Directory (AD) 104 and a reference binary blob would be supplied to the client device to continue the domain join when Windows is started. When the client applies this blob, the VM would become a member of the domain but the user still could not login with his corporate credentials if the device was not in the corporate network because the active directory server would not be available. In the past, this has been a common occurrence for VMs being provisioned while the user devices are remote.

This inability to login while offline only would only exist until the user first logins to the machine. After the first login, Windows caches the user credentials using one-way encryption. For future offline logins, Windows no longer needs AD connectivity, as it can validate the user login attempt against these cached credentials. Therefore, in the past, users would still need to physically bring their device, locally connect it to the corporate network (to gain access to the Domain Controller of the organization) and perform the first login. It would only be after that first login that the user would be able to access corporate resources remotely.

To address this inconvenience, the embodiments described herein enable the ability to log into the VM for the first time without having to connect the device 116 to the corporate network 120 either physically or over VPN. In the illustration shown in FIG. 1, this ability is enabled by utilizing the slave service 106 that acts as a user in the corporate network 102, with the slave service powering on a copy of the same VM image that is targeted for the user 124 (i.e. a VM 108 based on the same template or vanilla image), joining the VM 108 to the domain and performing the first login to the VM 108 automatically on behalf of the user 124 using the credentials received from the user 124. After the domain join and login process is complete, the VM 108 can be powered off and a delta 110 snapshot containing cached credentials 112 can be captured and sent to the computing device 116 in a secure manner. This delta would be merged onto the computing device 116 and enable the device 116 to access the corporate resources without ever having been locally connected to the corporate LAN 102 and the domain controller.

In one embodiment, the process for performing the offline domain join may begin when the user 124 requests a corporate virtual machine for download. The VM may be downloaded by the computing device 116 from a public server on the Internet (not shown), or alternatively, it can be downloaded from a server on the premises of the enterprise, such as server 112. Regardless of where the virtual disk is located, downloading the virtual disk of the VM often takes a substantial amount of time due to the size of the virtual disk. In one embodiment, as part of requesting the VM, the user 124 also provides their username and password 126 (and/or other authentication information) that will be used for performing the offline domain join. During the downloading of the virtual disk, the server 112 can start the slave service 106 to perform the offline domain join and first login process. In this process, the slave service 106 starts a VM 108 based on the same template (i.e. vanilla image) as the virtual disk being downloaded by the computing device 116 of user 124. Prior to starting the VM 108, a snapshot is captured, representing the state of the VM 108 before it is joined to the domain of the corporate local area network (LAN) 102. As used herein, the term "snapshot" refers to a copy of the virtual machine's disk file, such as a VMDK or a VHD format file, at a specific point in time. Conventionally, snapshots provide a change log for the virtual disk and can be used to restore a VM to a previous state when a failure or system error occurs. One possible implementation of snapshotting uses a read-only mechanism that makes any data that was previously writable on the virtual disk read-only at the time when the snapshot is captured. The mechanism saves the state of the VM at that point time and all subsequent changes are written in a separate delta file. These snapshots are sometimes used as restore points, to which the VM can revert in case of errors. In the embodiments described herein, however, the delta between the snapshots is used to capture the cached credentials and other security configuration changes made to the VM as part of the domain join and login process.

Once the pre-domain-join snapshot has been captured, the slave service powers on the VM 108 and logs into the VM 108 using a predefined local account. This is done in order to perform the domain join (e.g. Windows "djoin.exe" process) against the Active Directory 104 with the predefined binary blob and reboot. After the reboot, the VM 108 will have a new host name and it will be partially joined to the domain. Next, the slave service 106 will log into the rebooted VM 108 using the username and password 126 supplied by the remote user 124, i.e. it will perform the first login. In one embodiment, the username and password 126 may be supplied by the hypervisor 118. After the first login has been completed, the customized VM is fully joined to the domain and the user's cached credentials 122 are stored on the VM 108. The VM 108 can therefore access the private corporate resources located behind the secure firewall implemented by the organization to guard access to the corporate LAN 102.

At this time, the slave service 106 can power off the VM 108 and capture a post-domain-join snapshot of the VM 108. Based on the differences between the pre-domain-join snapshot and the post-domain-join snapshot, a delta 110 is generated. The delta 110 will be relatively small in size when compared to the virtual disk 100 being downloaded (e.g. in some cases the delta 110 may be less than 1 megabyte) and the delta will contain the cached credentials necessary for the VM 108 to access the private corporate resources on the corporate LAN 102. The delta 110 can be delivered to the computing device 116 as part of the process of downloading the virtual disk 100. Since the delta 110 contains the cached credentials 122, the computing device 116 can merge the downloaded delta 110 to the downloaded virtual disk 100 in order to enable the VM operating on the computing device 116 to access corporate resources on the corporate network 102 without ever having been locally connected or having had access to the domain controller. Merging the delta 110 with the downloaded virtual disk 100 on the computing device 116 is described in further detail with reference to FIG. 4 below.

Figure 2:
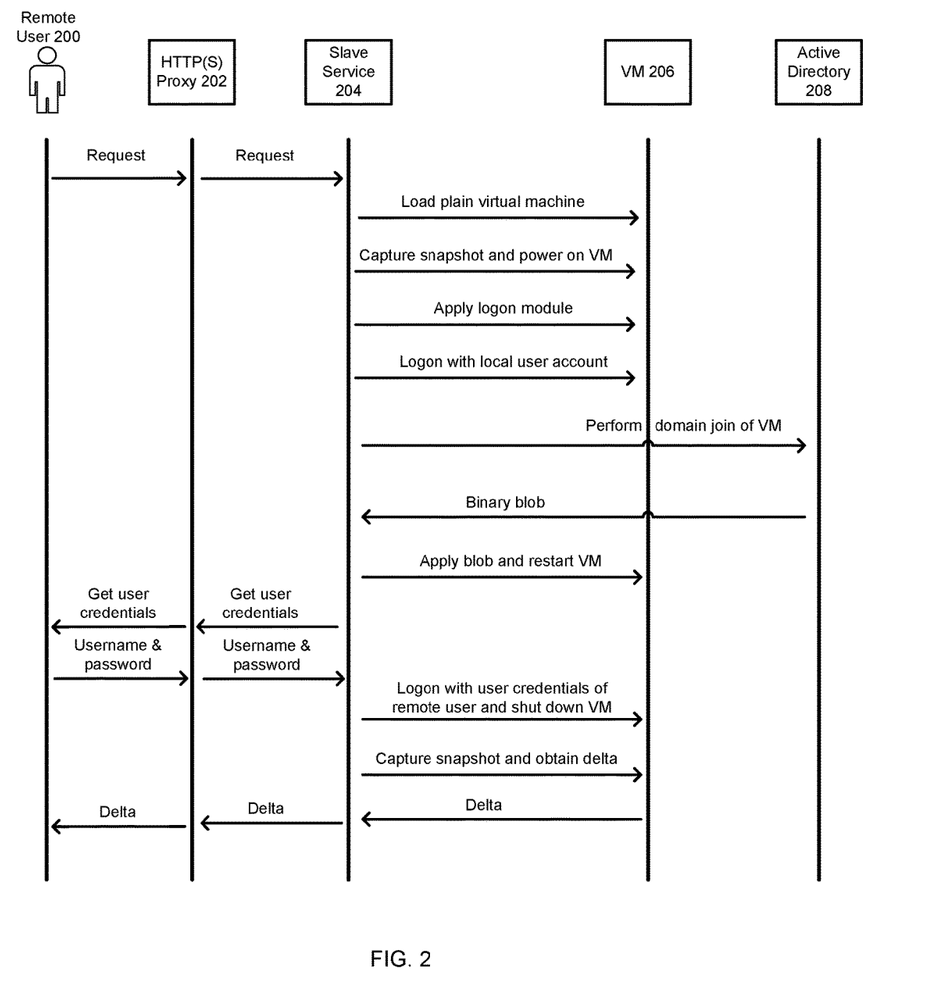
FIG. 2 illustrates an example of a flow diagram between components performing an offline domain join and first login to produce the cached credentials and security configuration changes on a virtual machine, in accordance with various embodiments.

FIG. 2 illustrates an example of a flow diagram between components performing an offline domain join and first login to produce the cached credentials and security configuration changes on a virtual machine, in accordance with various embodiments. In one embodiment, the process illustrated in this figure takes place while the remote user 200 is downloading the virtual disk representing the VM which will be used to access corporate resources. While a user is downloading such a virtual disk, the slave service 204 begins the customization of the VM 206.

As illustrated in the figure, when a request is received from the remote user (via the HTTP(s) Proxy 202), the slave service 204 first loads the plain VM based on the template or vanilla image. It then captures a base snapshot (i.e. pre-domain-join snapshot) to ensure that the base virtual disk in the template VM, and the user's VM will be identical. Once the snapshot has been captured, the service 204 powers on the VM 206, applies a logon module and logs into the VM 206 with a predefined local user account. In one embodiment, this user account is a generic user account that can be used to execute the offline domain join process of the operating system (e.g. Windows "djoin.exe" process), which causes the Active Directory 208 to produce a binary blob. Once the binary blob is received from the Active Directory 208, the VM 206 is rebooted. After this reboot, the template VM will have a new host-name and it will be partially joined to domain.

Next, the slave service 204 will login to the VM 206 using the actual username and password received from the remote user 200. In one embodiment, the username and password may be supplied to the slave service 204 by the hosted hypervisor operating on the computing device of the remote user 200. For example, the slave service 204 may request the user credentials (e.g. username and password and/or other authentication info) from the hypervisor operating on the remote user's device and the hypervisor may respond by providing the credentials. After the first login is complete, the customized VM 206 is fully joined to domain and one way encrypted credentials are stored in the security store on the VM 206. Now the VM 206 can be powered off and a post-domain-join snapshot of the VM 206 can be captured. Based on the differences between the pre-domain-join snapshot and post-domain-join snapshot, a delta is computed. The delta is then transmitted back to the computing device of the remote user 200.

Figure 3:
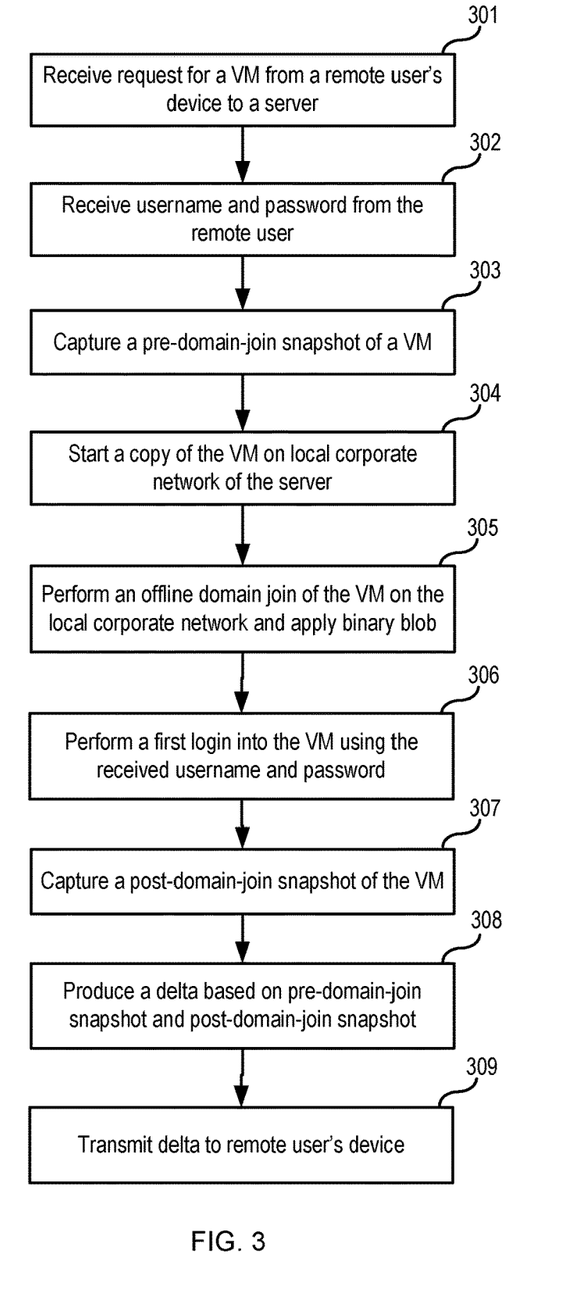
FIG. 3 illustrates an example of a process for generating a delta by performing an offline domain join and login, wherein the delta can be used to access corporate resources without access to the domain controller, in accordance with various embodiments.

FIG. 3 illustrates an example of a process for generating credentials by performing an offline domain join and login, wherein the credentials can be used to access corporate resources without access to the domain controller, in accordance with various embodiments. In operation 301, a request for a virtual machine is received from a user. The request may be received by a server residing on the local network of the enterprise over a remote network connection, such as an Internet connection. In operation 302, a username and password is also obtained from the user. In various embodiments, the username and password of the user may be provided as part of the request for the VM or provided as a separate communication between the user's computing device and the enterprise server. It should be noted that the username and password need not necessarily be obtained at this point in the process and may instead be provided at a later time, such as at the time just before performing a first login of the virtual machine (operation 305). Furthermore, in some embodiments, the username and password may be entered by the user himself or alternatively, the username and password may be supplied by the hosted hypervisor operating on the user's computing device to the server residing in the corporate network.

In operation 303, the server starts a slave service that first captures a snapshot of the base virtual machine, which has not been configured or joined to the domain yet. In operation 304, the service powers on the virtual machine and performs an offline domain join of the virtual machine on the local corporate network of the enterprise in step 305. Once the domain join process is complete, a binary blob is received from the Active Directory and applied on the virtual machine. After this is complete, the virtual machine can be restarted and the process of first login can be performed, as shown in operation 306. The first login is done using the username and password received from the user, as previously described. The process of first login produces a one way encrypted cached credential that is stored on the virtual machine. This cached credential enables the virtual machine to access privileged enterprise resources on the corporate LAN.

In operation 307, the virtual machine is powered off and another snapshot is taken, representing the point in time after which the virtual machine has been fully joined to the corporate domain and configured with the necessary security information and credentials to access the privileged resources. In operation 308, a delta file is produced, containing the changes between the pre-domain join snapshot and the post-domain-join snapshot. The delta contains all of the changes that have been made to the virtual machine through the process of joining the VM to the domain and configuring its security for accessing the resources. In operation 309, the delta is transmitted back to the computing device of the user, where the delta can be merged with the virtual disk being downloaded by the device.

Figure 4:
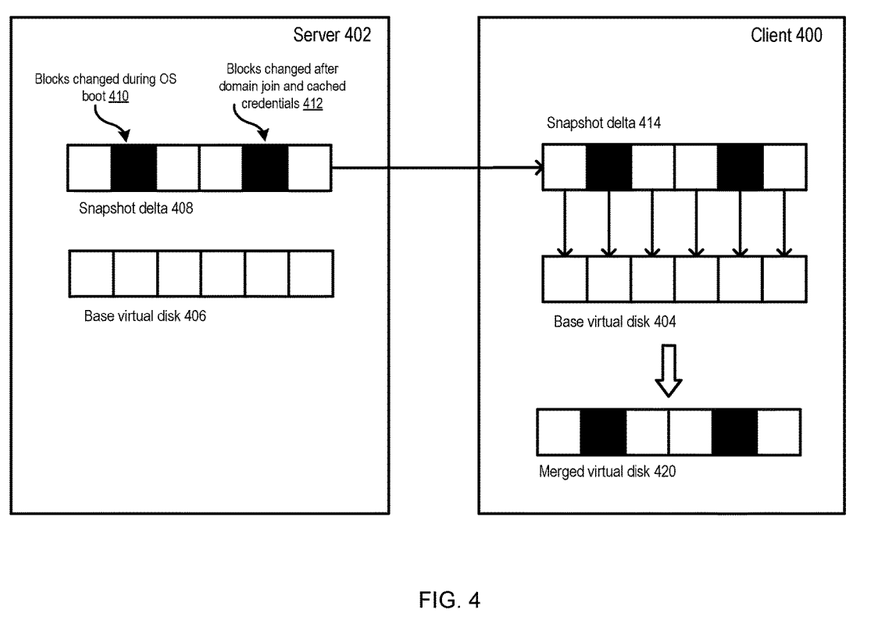
FIG. 4 illustrates an example of merging the delta file on the client computing device after it has been received from the server, in accordance with various embodiments.

FIG. 4 illustrates an example of merging the delta file on the client computing device after it has been received from the server, in accordance with various embodiments. It is important to note that this figure illustrates only one example of merging the delta onto the client computing device 400 and other methods of applying the changes are also possible within the scope of this disclosure. For example, while this figure illustrates the use of merging delta files into snapshots using a virtual machine snapshot and merge mechanism, other tools can be utilized instead to apply the changes. For example, there exist a number of tools that are capable of applying a change to a computing device without the use of snapshot consolidation or merging the delta into a virtual disk and these tools may also be used to determine what changes took place during the process of performing the offline domain join and first login on the virtual machine and then package those changes for delivery to the client device 400.

As illustrated in FIG. 4, the base virtual disk 404 being downloaded by the client 400 is identical to the base virtual disk 406 which will be utilized by the server 402 to perform the offline domain join and login process. Once the server 402 retrieves the base virtual disk 406, it can capture a first snapshot and then perform the offline domain process, reboot and first login using the remote user's credentials, as previously described. Subsequent to completing these processes, the server 402 may capture the second snapshot delta 408 containing blocks changed during the operating system (OS) boot 410, as well as blocks modified by the domain join and cached credentials 412. The snapshot delta 414 is then downloaded to the client 400 and merged with the base virtual disk 404 in order to produce the merged virtual disk 420, which contains all of the modified blocks to the virtual disk on the client 400. As such, any virtual machine started based on the merged virtual disk 420 will have the necessary credentials and be fully joined to the corporate domain as a result of these changed blocks. It should be noted that while this illustration assumes block-level modifications, the changes can be tracked on a file level instead in alternative embodiments.

In one embodiment, when the snapshot mechanism is implemented, the process of executing write or read requests follows a top to bottom approach. When multiple snapshots have been captured in the past, they will be hierarchically related in the sense that each snapshot will contain the changes that were made since the previous snapshot and so on. There is metadata maintained by the system that identifies which is the top level snapshot and it is from this top level snapshot that the I/O mechanism begins to read when searching for blocks or files that are requested. Thus, when a read/write request is received, the top level snapshot is inspected first. If the requested file or block is not found in the top level snapshot, the mechanism reads the next snapshot in the chain and so on until the file/block is found. Because of this process, merging the delta on the client 400 may, in at least some embodiments, require the metadata to be modified to indicate which snapshot should be used as the top level snapshot. This is because the system may need to understand that there is another snapshot that has been added which contains certain changes (i.e. security credentials, etc.). For example, in certain snapshot implementations, a virtual machine configuration file (e.g. .VMX file) may need to modified to indicate this information. As such, in these implementations, the process of merging the delta on the client device 400 includes the steps of modifying the appropriate metadata to reflect the addition of new snapshot(s).

Figure 5:
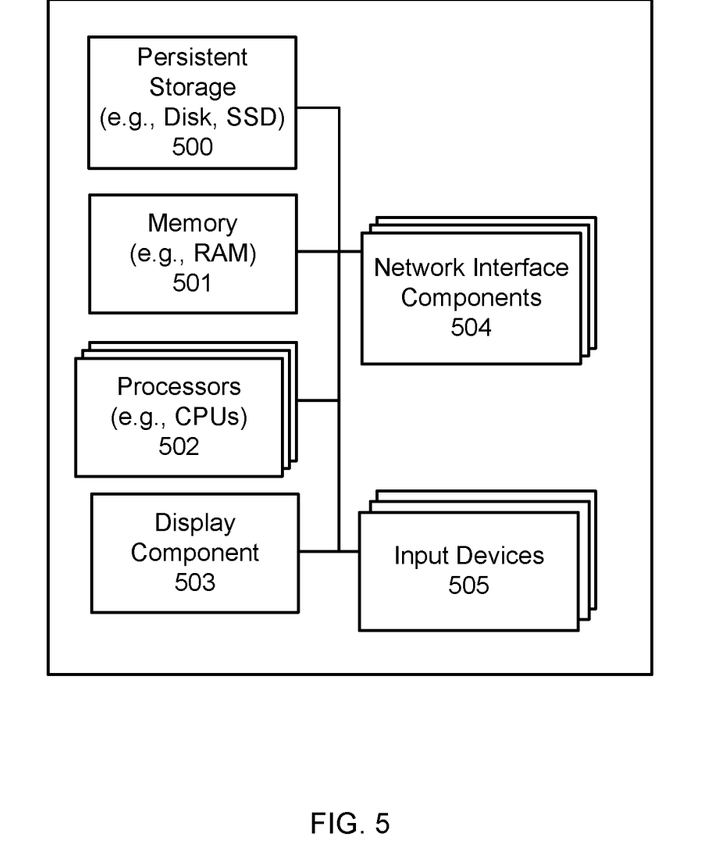
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for performing an offline domain join of a virtual machine, the method comprising:
in response to a request for a virtual machine received from a client computing device,
performing a domain join of the virtual machine with an active directory service on a local network;
capturing a post-domain-join snapshot of the virtual machine and producing a delta that contains one or more changes to the virtual machine that were made during the domain join; and
transmitting the delta to the client computing device to be applied to a copy of the virtual machine executed on the client computing device.

2. The method of claim 1, further comprising:
receiving a user name and password from the client computing device;
performing a first login to the virtual machine with a domain controller of the local network using the received user name and password, wherein performing the first login to the virtual machine causes a set of encrypted credentials to be stored on the virtual machine.

3. The method of claim 1, wherein performing the domain join of the virtual machine with the active directory service produces a binary blob that is supplied to the virtual machine.

4. The method of claim 1, further comprising:
in response to the request for the virtual machine, starting a slave service that acts as a user of the virtual machine on the local network, the slave service configured to:
power on the virtual machine with a local user account;
execute a domain join process of an operating system of the virtual machine and receive a blob file from the active directory service;
apply the blob file on the virtual machine and restart the virtual machine;
perform a login to the virtual machine as a domain user using a username and password received from the client computing device; and
power off the virtual machine.

5. The method of claim 1, further comprising:
receiving the delta on the client computing device;
applying the delta to the copy of the virtual machine executed on the client computing device, wherein the copy of the virtual machine is based on a virtual disk downloaded by the client computing device;
wherein applying the delta to the copy of the virtual machine enables the virtual machine to access one or more private resources residing on the local network located behind a secure firewall.

6. The method of claim 1, further comprising:
capturing a pre-domain-join snapshot of the virtual machine prior to the domain join;
capturing the post-domain-join snapshot of the virtual machine after the domain join; and
producing the delta based on the pre-domain-join snapshot and the post-domain-join snapshot.

7. The method of claim 1, wherein performing the domain join of the virtual machine is performed during a download of a virtual disk by the client computing device.

8. A computing device, comprising:
one or more processors; and
memory storing instructions that when executed by the one or more processors, cause the computing device to:
in response to a request for a virtual machine received from a client computing device,
perform a domain join of the virtual machine with an active directory service on a local network;
capture a post-domain-join snapshot of the virtual machine and produce a delta that contains one or more changes to the virtual machine that were made during the domain join; and
transmit the delta to the client computing device to be applied to a copy of the virtual machine executed on the client computing device.

9. The computing device of claim 8, the memory further comprising instructions that when executed by the one or more processors, cause the computing device to:
receive a user name and password from the client computing device; and
perform a first login to the virtual machine with a domain controller of the local network using the received user name and password, wherein performing the first login to the virtual machine causes a set of encrypted credentials to be stored on the virtual machine.

10. The computing device of claim 8, wherein performing the domain join of the virtual machine with the active directory service produces a binary blob that is supplied to the virtual machine.

11. The computing device of claim 8, the memory further comprising instructions that when executed by the one or more processors, cause the computing device to:
in response to the request for the virtual machine, start a slave service that acts as a user of the virtual machine on the local network, the slave service configured to:
power on the virtual machine with a local user account;
execute a domain join process of an operating system of the virtual machine and receive a blob file from the active directory service;
apply the blob file on the virtual machine and restart the virtual machine;
perform a login to the virtual machine as a domain user using a username and password received from the client computing device; and
power off the virtual machine.

12. The computing device of claim 8, the memory further comprising instructions that when executed by the one or more processors, cause the computing device to:
capture a pre-domain-join snapshot of the virtual machine prior to the domain join;
capture the post-domain-join snapshot of the virtual machine after the domain join; and
produce the delta based on the pre-domain-join snapshot and the post-domain-join snapshot.

13. The computing device of claim 8, wherein performing the domain join of the virtual machine is performed during a download of a virtual disk by the client computing device.

14. The computing device of claim 8, wherein performing the domain join of the virtual machine further comprises:
applying one or more security policies of the local network to the virtual machine.

15. A non-transitory computer readable storage medium comprising one or more sequences of instructions, the instructions when executed by one or more processors causing the one or more processors to execute the operations of:

in response to a request for a virtual machine received from a client computing device,         performing a domain join of the virtual machine with an active directory service on a local network;

capturing a post-domain-join snapshot of the virtual machine and producing a delta that contains one or more changes to the virtual machine that were made during the domain join; and         transmitting the delta to the client computing device to be applied to a copy of the virtual machine executed on the client computing device.

16. The non-transitory computer readable storage medium of claim 15, further comprising instructions executed by one or more processors causing the one or more processors to execute the operations of:

receiving a user name and password from the client computing device;

performing a first login to the virtual machine with a domain controller of the local network using the received user name and password, wherein performing the first login to the virtual machine causes a set of encrypted credentials to be stored on the virtual machine.

17. The non-transitory computer readable storage medium of claim 15, wherein performing the domain join of the virtual machine with the active directory service produces a binary blob that is supplied to the virtual machine.

18. The non-transitory computer readable storage medium of claim 15, further comprising instructions executed by one or more processors causing the one or more processors to execute the operations of:

in response to the request for the virtual machine, starting a slave service that acts as a user of the virtual machine on the local network, the slave service configured to:

power on the virtual machine with a local user account;

execute a domain join process of an operating system of the virtual machine and receive a blob file from the active directory service;

apply the blob file on the virtual machine and restart the virtual machine;

perform a login to the virtual machine as a domain user using a username and password received from the client computing device; and         power off the virtual machine.

19. The non-transitory computer readable storage medium of claim 15, further comprising instructions executed by one or more processors causing the one or more processors to execute the operations of:

receiving the delta on the client computing device;

applying the delta to the copy of the virtual machine executed on the client computing device, wherein the copy of the virtual machine is based on a virtual disk downloaded by the client computing device;

wherein applying the delta to the copy of the virtual machine enables the virtual machine to access one or more private resources residing on the local network located behind a secure firewall.

20. The non-transitory computer readable storage medium of claim 15, further comprising instructions executed by one or more processors causing the one or more processors to execute the operations of:

capturing a pre-domain-join snapshot of the virtual machine prior to the domain join;

capturing the post-domain-join snapshot of the virtual machine after the domain join; and     producing the delta based on the pre-domain-join snapshot and the post-domain-join snapshot.

\* \* \* \* \*